(12) United States Patent
Mayell

(10) Patent No.: US 8,130,517 B2
(45) Date of Patent: Mar. 6, 2012

(54) FORWARD CONVERTER TRANSFORMER SATURATION PREVENTION

(75) Inventor: Robert J. Mayell, San Francisco, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

(21) Appl. No.: 13/090,160

(22) Filed: Apr. 19, 2011

(65) Prior Publication Data

US 2011/0194310 A1    Aug. 11, 2011

Related U.S. Application Data

(63) Continuation of application No. 12/950,783, filed on Nov. 19, 2010, now Pat. No. 7,952,898, which is a continuation of application No. 12/234,525, filed on Sep. 19, 2008, now Pat. No. 7,859,869.

(51) Int. Cl.
*H02H 7/122* (2006.01)
*H02M 3/335* (2006.01)

(52) U.S. Cl. .................. 363/56.01; 363/21.04

(58) Field of Classification Search ............ 363/15, 363/16, 21.04, 56.01, 56.06–56.08, 95, 97, 363/131, 132

See application file for complete search history.

(56) References Cited

U.S. PATENT DOCUMENTS

| 4,127,894 | A | 11/1978 | Bishop et al. | |
| 4,439,822 | A | 3/1984 | Cocconi | |
| 5,355,299 | A | 10/1994 | Carpita | |
| 5,801,932 | A | 9/1998 | Hwang et al. | |
| 6,002,596 | A * | 12/1999 | Mayer et al. | 363/21.04 |
| 6,442,052 | B1 | 8/2002 | Hemena et al. | |
| 7,012,820 | B2 * | 3/2006 | Jitaru | 363/21.04 |
| 2010/0246215 | A1 * | 9/2010 | Mase et al. | 363/21.04 |

* cited by examiner

*Primary Examiner* — Matthew Nguyen
(74) *Attorney, Agent, or Firm* — Blakely Sokoloff Taylor & Zafman LLP

(57) ABSTRACT

A power converter in one aspect limits the magnetic flux in a transformer. A control circuit included in the power converter includes a pulse width modulator, logic circuits and saturation prevention circuits. The saturation prevention circuits assert a first signal when a first integral value of the input voltage reaches a first threshold value and assert a second signal after a delay time that begins when a difference between the first integral value and a second integral value of a reset voltage of the transformer falls to a second threshold value. The logic circuits turn off the switch when the first signal is asserted, and allow the switch to turn on and off in accordance with the pulse width modulator when the second signal is asserted.

13 Claims, 16 Drawing Sheets

FORWARD CONVERTER TRANSFORMER SATURATION PREVENTION

REFERENCE TO RELATED APPLICATIONS

This application is a continuation of U.S. patent application Ser. No. 12/950,783, filed on Nov. 19, 2010, now pending, which is a continuation of U.S. patent application Ser. No. 12/234,525, filed on Sep. 19, 2008, now U.S. Pat. No. 7,859,869. U.S. patent application Ser. No. 12/950,783 and U.S. Pat. No. 7,859,869 are hereby incorporated by reference.

BACKGROUND INFORMATION

1. Field of the Disclosure

The present invention relates generally to power supplies and, more particularly, the present invention relates to forward converters.

2. Background

AC-to-DC and DC-to-DC power supplies typically use a power conversion topology commonly known in the art as a forward converter.

A forward converter may use either one or two active switches to apply an input voltage to the primary winding of a transformer. The single-switch forward converter uses one active switch to apply an input voltage to the primary winding of a transformer. The two-switch forward converter uses two active switches to apply an input voltage to the primary winding of a transformer. In each type of forward converter, a secondary winding on the transformer produces a scaled replica of the voltage on the primary winding. The voltage on the secondary winding is rectified and filtered to become an output voltage.

In a power supply, the output voltage is normally regulated by a control circuit. The control circuit compares the output voltage to a desired value. The control circuit turns the active switches on and off, and adjusts the time that the switches are on (and off) to keep the output near the desired value.

The choice of one or two switches in the design of a forward converter is heavily influenced by cost. The two-switch forward converter is often the lowest cost configuration that meets the requirements of power supplies for personal computers and similar applications.

Both the single switch configuration and the two switch configuration allow the magnetic flux of the transformer to reset (that is, return to a much lower value) when the active switches are off. Resetting the magnetic flux of the transformer prevents excess stored energy from saturating the transformer (which alters properties of the transformer). The reset is generally achieved by applying a reset voltage of appropriate magnitude and duration to the primary winding when the active switches are off.

It is often desirable to set the reset voltage to a higher value than the input voltage that appears on the primary winding when the switches are on. A common low-cost technique to provide a suitable reset voltage uses a simple reset circuit to develop a substantially constant voltage that is applied to the primary winding during the reset time of the transformer. In a two-switch forward converter, the reset voltage is the sum of the input voltage and the voltage of the reset circuit. In a single-switch forward converter, the reset voltage is the voltage of the reset circuit.

A difficulty with the technique that uses the simple reset circuit is that the appropriate reset voltage can change suddenly when the control circuit responds to a change in the input voltage or to a change in the load on the power supply. Also, the simple reset circuit usually cannot respond fast enough to transient events (such as the start-up and the shutdown of the power supply) to guarantee a proper reset of the transformer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Methods and apparatuses for implementing a proper reset of the transformer with a relatively simple passive circuit to develop the reset voltage. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Figure 1:
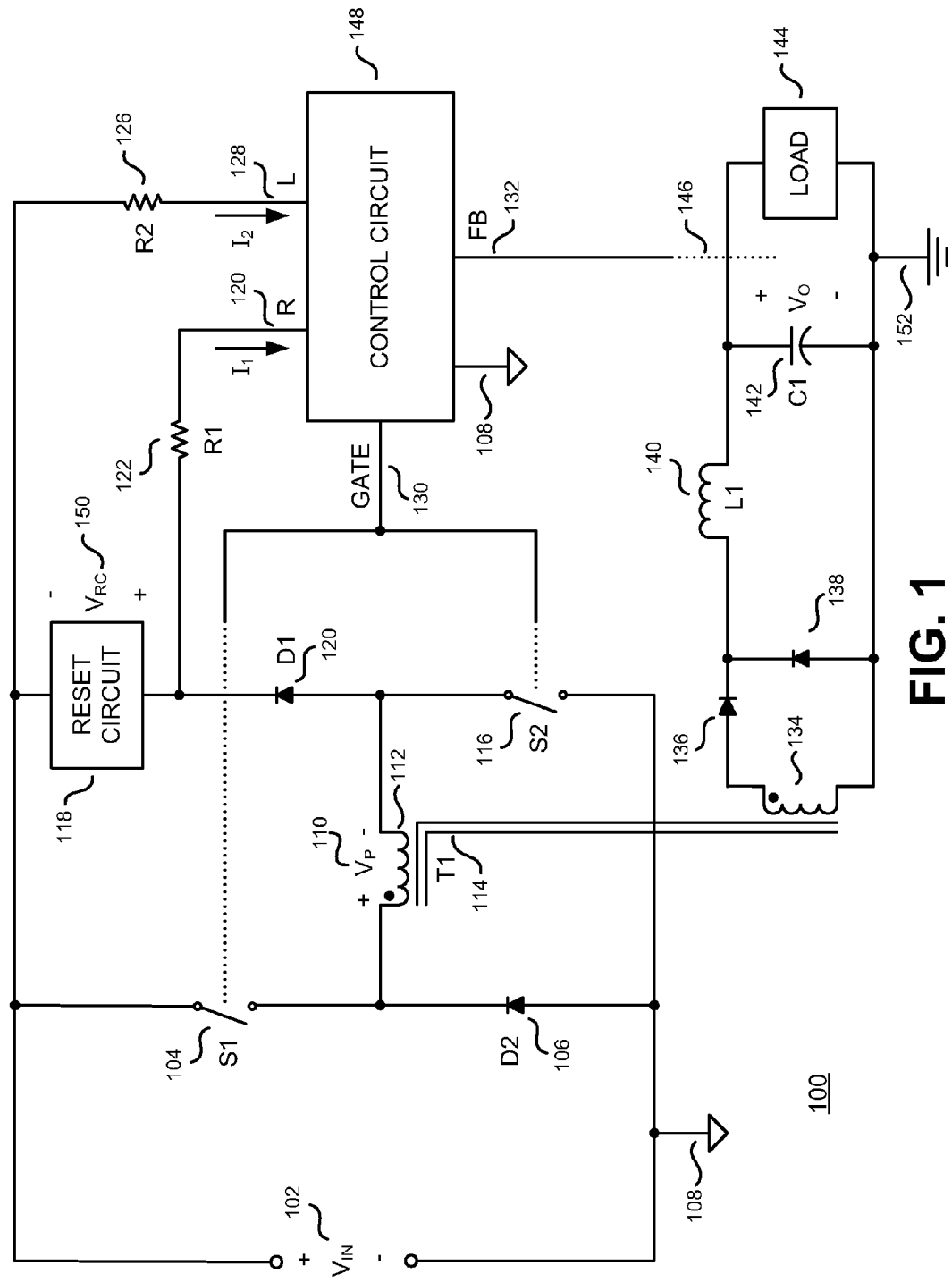
FIG. 1 is a schematic diagram that illustrates the salient features of a two-switch forward converter with a control circuit that includes the invention.

FIG. 1 is an illustration of an example two-switch forward converter 100 in accordance with the present invention. The two-switch forward converter uses two active switches, S1 104 and S2 116, with two passive switches, D1 120 and D2 106 in a configuration that produces a voltage $V_P$ 110 on a primary winding 112 of a transformer T1 114 from an input voltage $V_{IN}$ 102. In the example of FIG. 1, the input voltage $V_{IN}$ 102 has a negative terminal that is common with an input return 108.

Active switch S1 104 is often referred to as a high side switch because it has one terminal common with the positive terminal of the input voltage $V_{IN}$ 102. Active switch S2 116 is often referred to as a low-side switch because it has one terminal common with the input return 108. Similarly, passive switch D1 120 is may be referred as a high-side switch and passive switch D2 106 may be referred to as a low-side switch.

A secondary winding 134 of the transformer T1 114 produces a voltage proportional to the primary voltage $V_P$ 110. An output diode 136 rectifies the voltage at the secondary winding 134. A freewheeling diode 138, an output inductor L1 140, and an output capacitor C1 142 filter the rectified voltage from the secondary winding 134 to produce an output voltage $V_O$ at a load 144. In the example of FIG. 1, the negative terminal of the capacitor C1 142 with output voltage $V_O$ is common with an output return 152.

The secondary winding 134 of the transformer T1 114 typically is galvanically isolated from the primary winding 112. That is, a DC voltage between the primary return 108 and the secondary return 152 normally produces substantially zero current between the primary return 108 and the secondary return 152.

A difference between an active switch and a passive switch is that the active switch receives a control signal that opens and closes the switch whereas a passive switch does not receive a control signal. An open switch does not normally conduct current. A closed switch may conduct current. Active switches typically have one or more control terminals that determine whether or not two other terminals of the active switch may conduct current. In the example of FIG. 1, a gate signal 130 opens and closes active switches S1 104 and S2 116. In practice, switches S1 104 and S2 116 are typically semiconductor devices such as for example metal oxide semiconductor field effect transistors (MOSFETs), or for example bipolar junction transistors (BJTs), or for example insulated gate bipolar transistors (IGBTs).

Passive switches generally have only two terminals. Typically, the voltage between the terminals determines whether a passive switch is open or closed. A diode is sometimes considered a passive switch, since it conducts current when the voltage between its two terminals has one polarity (anode positive with respect to cathode), and it substantially blocks current when the voltage between the terminals has the opposite polarity (anode negative with respect to cathode). The passive switches D1 120 and D2 106 in the example of FIG. 1 are PN junction diodes.

In the two-switch forward converter of FIG. 1, a magnetic flux increases in the transformer T1 114 when the active switches S1 104 and S2 116 are turned on, and the magnetic flux decreases in the transformer T1 114 when the active switches S1 104 and S2 116 turn off. The magnetic flux is associated with a magnetizing current that enters the windings of the transformer when the active switches S1 104 and S2 116 are on. When the active switches S1 104 and S2 116 turn off, the magnetizing current leaves the primary of the transformer T1 114 through the passive switches D1 120 and D2 106. A reset circuit 118 produces a reset circuit voltage $V_{RC}$ 150 from the magnetizing current that leaves the transformer through passive switches D1 120 and D2 106.

The magnetic flux increases and decreases at rates that are proportional to the voltage $V_P$ 110 on the primary winding. Therefore, when the active switches S1 104 and S2 116 are on, the magnetic flux increases at a rate substantially proportional to the input voltage $V_{IN}$. Similarly, when the passive switches D1 120 and D2 106 are on, the magnetic flux decreases at a rate substantially proportional to the sum of the input voltage $V_{IN}$ 102 and the reset circuit voltage $V_{RC}$ 150.

The transformer T1 114 is typically constructed with a magnetic material to achieve the desired coupling between primary winding 112 and secondary winding 134. The magnetic material of the transformer T1 114 normally loses desirable properties if the magnetic flux should reach a saturation value. In accordance with the present disclosure, the magnetic flux in the transformer is prevented from reaching its saturation value.

Although it is possible to measure the magnetic flux directly in the transformer, methods of doing so are typically not practical for low cost power supply applications. In contrast, the present disclosure uses a simple indirect technique to indicate the magnitude of the magnetic flux. The change in magnetic flux during the time that the active switches are on is proportional to the time integral of the voltage on any winding of the transformer. If the initial value of the magnetic flux is much less than the saturation value, knowledge of the change in the magnetic flux during a switching period is normally sufficient to prevent the magnetic flux from reaching its saturation value.

The desired management of magnetic flux can be achieved by integrating the voltage on a winding of the transformer while the active switches are on to estimate a peak value of the magnetic flux. Then, the voltage on a winding can be integrated while the active switches are off to ensure that magnetic flux decreases by the same amount that it increased while the active switches were on. In the example of FIG. 1, the magnetic flux is managed by measuring and integrating the voltages that will be applied to the primary winding 112 of the transformer T1 114. Thus, the disclosed measuring and integrating voltage technique can be distinguished from a direct measurement of a voltage on a winding of the transformer.

In the example of FIG. 1, a control circuit 148 receives a feedback signal 146 at a feedback terminal 132. Galvanic isolation is typically maintained between the input return 108 and the output return 152 in the transmission of the feedback signal 146 to the feedback terminal 132 by ordinary methods known to those skilled in the art, such as for example the use of an optical coupler or for example the use of a signal transformer. The details of the transmission of the feedback signal 146 are not discussed in this disclosure to help avoid obscuring the important features of the invention.

In the example of FIG. 1, the control circuit 148 receives a first current $I_1$ at a reset voltage sensing terminal 120 and a second current $I_2$ at line voltage sensing terminal 128. The voltage at the reset voltage sensing terminal 120 and the voltage at the line voltage sensing terminal 128 are typically low values that are electrically referenced to the input return 108. In one example, the voltages at the reset voltage sensing terminal 120 and at the line voltage sensing terminal 128 are less than approximately three volts whereas the input voltage $V_{IN}$ is typically between 100 volts and 400 volts. Therefore, the current $I_2$ at the line voltage sensing terminal 128 is substantially directly proportional to the input voltage $V_{IN}$ 102 and inversely proportional to the value of the resistor R2 126. Similarly, the current $I_1$ at the reset voltage sensing terminal 120 is substantially directly proportional to the sum of the input voltage $V_{IN}$ 102 and the voltage $V_{RC}$ 150 on the reset circuit 118 (and inversely proportional to the value of the resistor R1 122). Control circuit 148 responds to the signals at the reset voltage sensing terminal 120, the line voltage sensing terminal 128, and the feedback terminal 132 to produce a gate signal 130 that turns the active switches S1 104 and S2 116 on and off to regulate the output voltage $V_O$ at the load 144 and to prevent saturation of the transformer T1 114.

Figure 2:
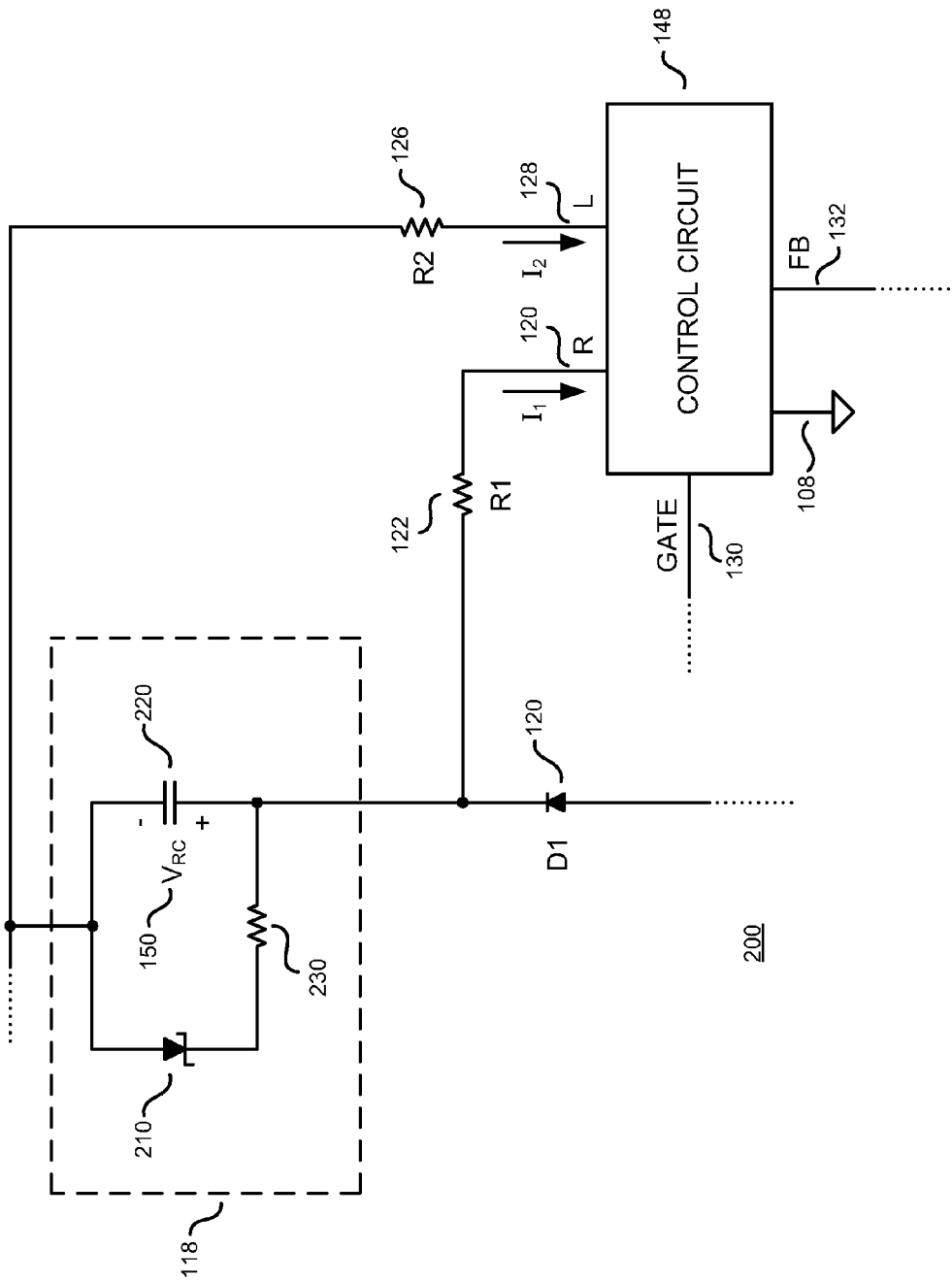
FIG. 2 is a schematic diagram that shows details of an example reset circuit that may be used with the two-switch forward converter of FIG. 1.

FIG. 2 shows details of a typical reset circuit 118 in the two-switch converter of FIG. 1. The active switches S1 104 and S2 116 turn on for a portion of a switching period. The active switches S1 104 and S2 116 are off for the remainder of the switching period. The fraction of the switching period when the active switches are on is often known as the duty ratio. A two-switch forward converter that does not use a reset circuit 118 has a maximum duty ratio of 50% to ensure that the increase in magnetic flux when the active switches are on is the same as the decrease in magnetic flux when the active switches are off. That is, the active switches are not normally closed for more than half the time in a complete switching period for repetitive switching cycles.

A two-switch forward converter that uses a reset circuit 118 can extend the maximum duty ratio beyond 50%. The ability to operate at a larger duty ratio has the benefit of permitting operation over a wider range of input voltage. Another advantage of the extended duty ratio is the reduction in RMS (root-mean-square) current in the active switches S1 104 and S2 116, thereby reducing conduction loss and raising efficiency.

The reset circuit illustrated in the example 200 of FIG. 2 develops a voltage $V_{RC}$ 150 that is substantially constant for several switching cycles. The reset circuit 118 includes a Zener diode 210, a resistor 230, and a capacitor 220. The current from the high-side passive switch D1 120 establishes a voltage $V_{RC}$ 150 on capacitor 220 between the positive terminal of the input voltage $V_{IN}$ 102 and the high-side passive switch D1 110. Zener Diode 210 and resistor 230 substantially limit the maximum voltage on capacitor 220.

Figure 3:
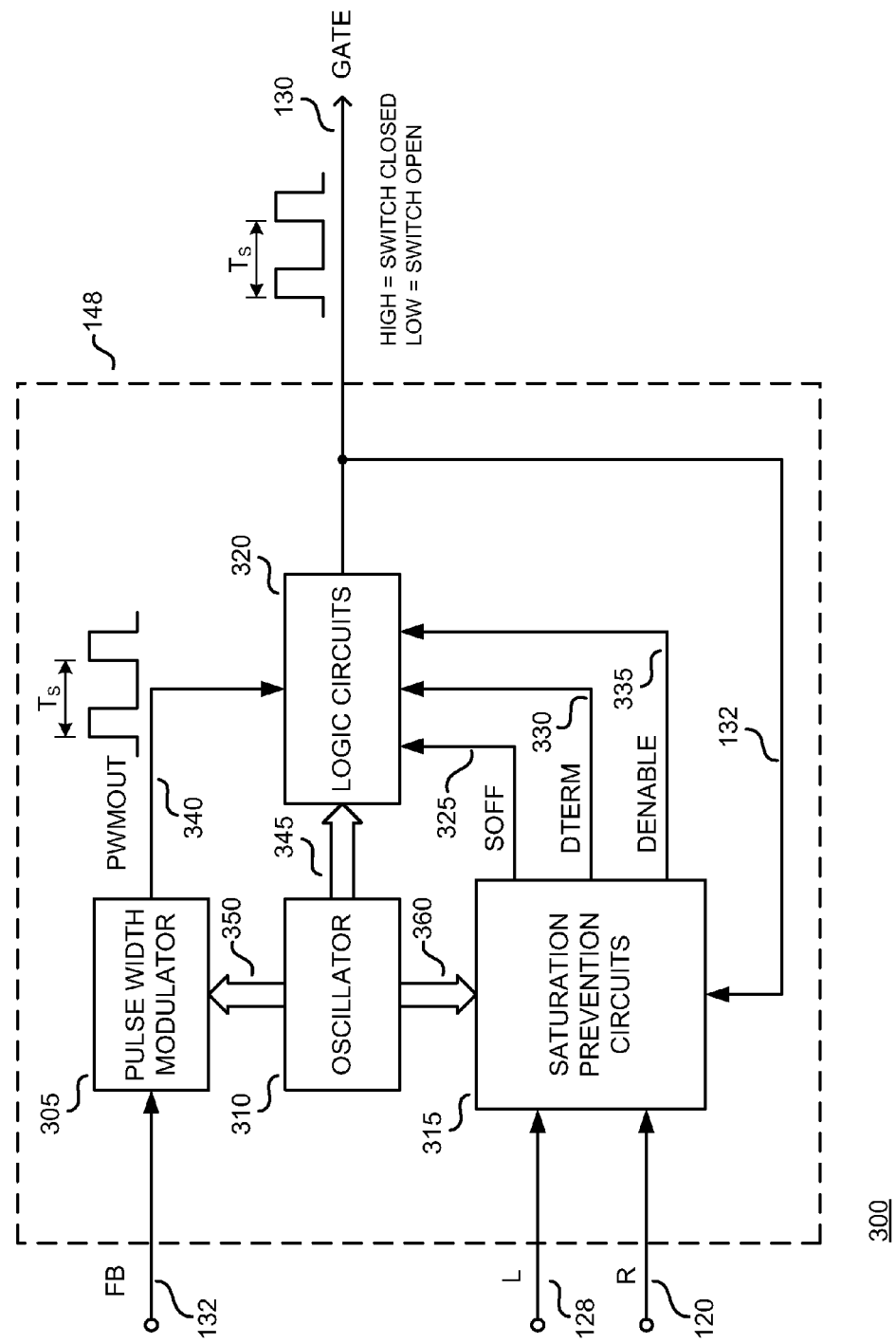
FIG. 3 is a block diagram that shows functional elements and signals included in the control circuit of the two-switch forward converter of FIG. 1.

FIG. 3 is a block diagram 300 that shows several internal functional blocks of the control circuit 148. The output of the control circuit is the gate signal 130 that opens and closes the active switches S1 104 and S2 120. In the example of FIG. 1, the active switches S1 104 and S2 116 are closed when the signal at the gate terminal 130 is at a high level. In the example of FIG. 1, the active switches S1 104 and S2 116 are open when the signal at the gate terminal 130 is at a low level. An oscillator 310 provides a plurality of timing signals 350, 345, and 360 to a pulse width modulator (PWM) 305, saturation prevention circuits 315, and logic circuits 320. The pulse width modulator 305 responds to a signal at the feedback terminal 132 to produce a PWMOUT signal 340. The PWMOUT signal 340 is a timing signal having a switching period $T_S$ and a duty ratio required to regulate an output of the power supply.

Saturation prevention circuits 315 receive signals from line voltage sensing terminal 128, from reset voltage sensing terminal 120, and from gate signal 132 at gate terminal 130. The saturation prevention circuits 315 produce signals SOFF 325, DTERM 330, and DENABLE 335 that are received by logic circuits 320. Logic circuits 320 process the signals received from the saturation prevention circuits 315 and from the pulse width modulator 305 to determine whether or not the PWMOUT signal 340 should be allowed to inhibit gate signal 132 to prevent saturation of the transformer T1 114. In one example, the SOFF signal 325 demands that the active switches stay off. In one example, the DTERM signal 330 demands that the active switches turn off immediately. In one example, the DENABLE signal 335 allows the active switches to turn on and off in accordance with the PWMOUT signal 340.

Figure 4:
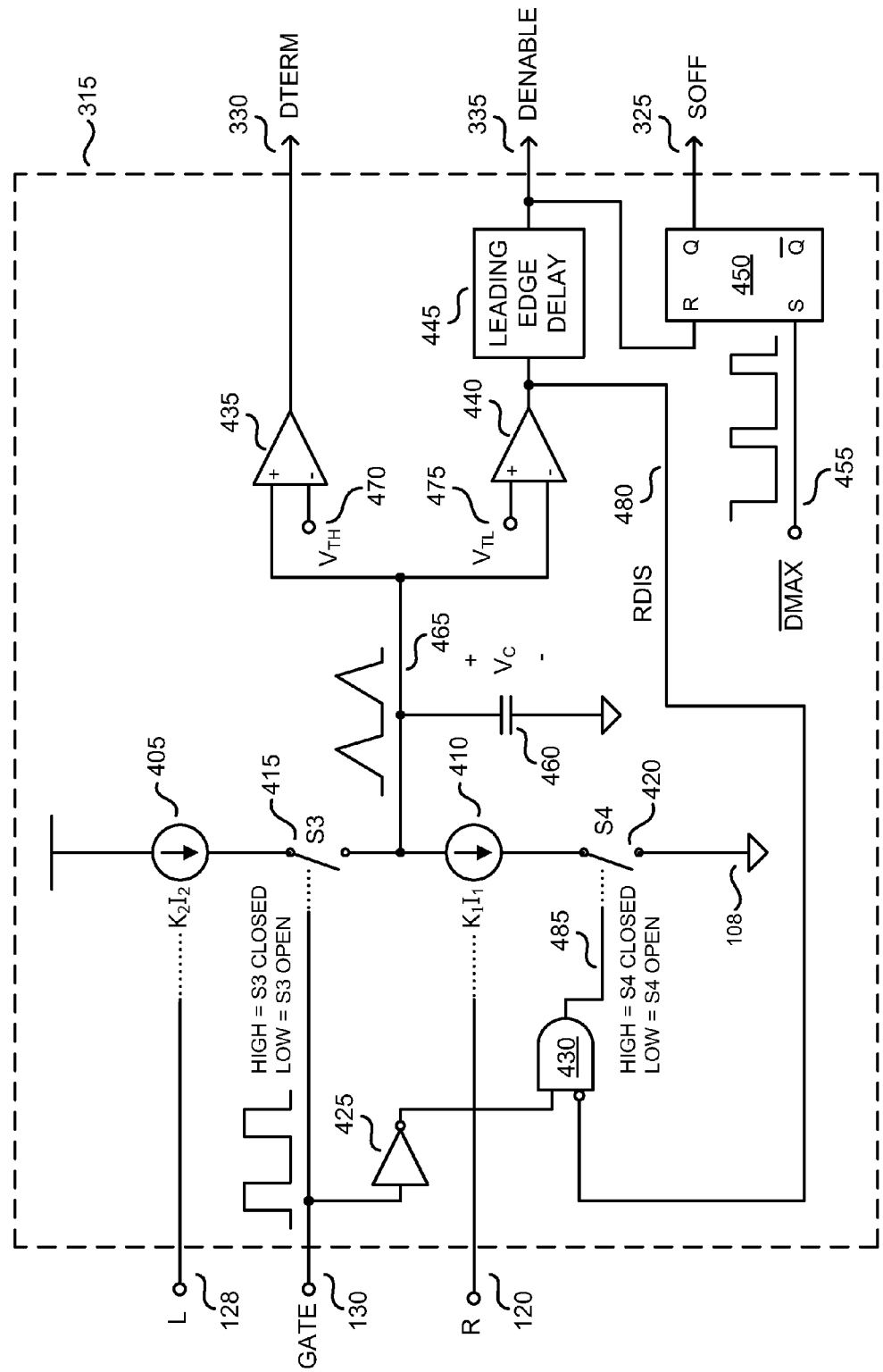
FIG. 4 is a schematic diagram that illustrates one example of the functions included in the saturation prevention circuits included in the control circuit of FIG. 3.

FIG. 4 is schematic diagram 400 that illustrates the functions of saturation prevention circuits included in block 315 of FIG. 3. A controlled current source 405 is responsive to the current received by line voltage sensing terminal 128. The value of the controlled current source 405 is directly proportional to the current $I_2$ received at the line voltage sensing terminal 128.

Also in FIG. 4 is a controlled current source 410 that is responsive to the current received at the reset voltage sensing terminal 120. The value of the controlled current source 410 is directly proportional to the current $I_1$ received at the reset voltage sensing terminal 120.

Switches S3 415 and S4 420 open and close in response to a signal at the gate terminal 130. Inverter 425 and AND gate 430 prevent switches S3 415 and S4 420 from being closed at the same time.

When the signal at the gate terminal 130 is high, the input voltage $V_{IN}$ 102 is applied to the primary winding 112 of the transformer T1 114. The high signal at the gate terminal 130 closes switch S3 415 and opens switch S4 420, allowing current from the controlled current source 405 to increase the voltage $V_C$ 465 on the integrating capacitor 460. The voltage 465 on the integrating capacitor represents the magnetic flux in the transformer T1 114.

When the signal at the gate terminal 130 is low, the sum of the input voltage $V_{IN}$ 102 and the voltage $V_{RC}$ 150 from the reset circuit 118 is applied to the primary winding 112 of the transformer T1 114. The low signal at the gate terminal 130 opens switch S3 415 and closes switch S4 420, allowing current from the controlled current source 410 to decrease the voltage $V_C$ 465 on the integrating capacitor 460.

The voltage $V_C$ 465 on the integrating capacitor 460 is received by comparators 435 and 440. Comparator 435 compares the voltage $V_C$ 465 on the integrating capacitor 460 with an upper threshold voltage $V_{TH}$ 470. Comparator 440 compares the voltage $V_C$ 465 on the integrating capacitor 460 with a lower threshold voltage $V_{TL}$ 475. The upper threshold voltage $V_{TH}$ 470 is greater than the lower threshold voltage $V_{TL}$ 475.

If the voltage $V_C$ 465 on the integrating capacitor 460 remains less than the upper threshold voltage $V_{TH}$ 470 during the time that the signal at the gate terminal 130 is high, the signal at the gate terminal 130 is allowed to remain high and to go low according to the duty ratio defined by the PWMOUT signal 340. A low signal at the gate terminal 130 opens switch S3 415 and closes switch S4 420 for as long as the voltage $V_C$ 465 on the integrating capacitor 460 is above the lower threshold voltage $V_{TL}$ 475. When the voltage $V_C$ 465 on the integrating capacitor 460 is no longer greater than the lower threshold voltage $V_{TL}$ 475, the RDIS signal 480 at the output of the comparator 440 goes high to open switch S4 420, thereby stopping the discharge of the integrating capacitor 460.

A DMAX complement signal 455 goes high near the end of every switching cycle to establish a maximum duty ratio. It is typically necessary to define a maximum duty ratio to guarantee proper operation of the oscillator 310. FIG. 4 shows that the latch 450 is set by the DMAX complement signal 455 when the DMAX compliment signal 455 goes high, thereby setting a high level at the SOFF terminal 325. The logic circuits 320 force the signal at the gate terminal 130 to be low when the signal at the SOFF terminal 325 is high.

The RDIS signal 480 goes high at the end of the discharge of the integrating capacitor 460. The rising edge of the RDIS signal 480 is delayed by a leading edge delay 445 to cause DENABLE signal 335 to go high after a delay time $T_d$. A high level of the DENABLE signal 330 when the DMAX complement signal 455 is low resets the latch 450 to bring the signal at the SOFF terminal 325 low. The RDIS signal 480 goes low when switch S3 415 closes and integrating capacitor 460 charges to raise the voltage $V_C$ 465 above the lower threshold voltage $V_{TL}$ 475. The DENABLE signal 330 goes low immediately when the RDIS signal 480 goes low.

If the voltage $V_C$ 465 on the integrating capacitor 460 is not less than the upper threshold voltage $V_{TH}$ 470, then the output of comparator 435 goes to a high level to assert the DTERM signal 330. Logic circuits 320 respond to a high level of the DTERM signal 330 by forcing the signal at the gate terminal 130 to a low level, thereby opening the active switches S1 104 and S2 120 to stop the increase in magnetic flux in the transformer T1 114.

Figure 5:
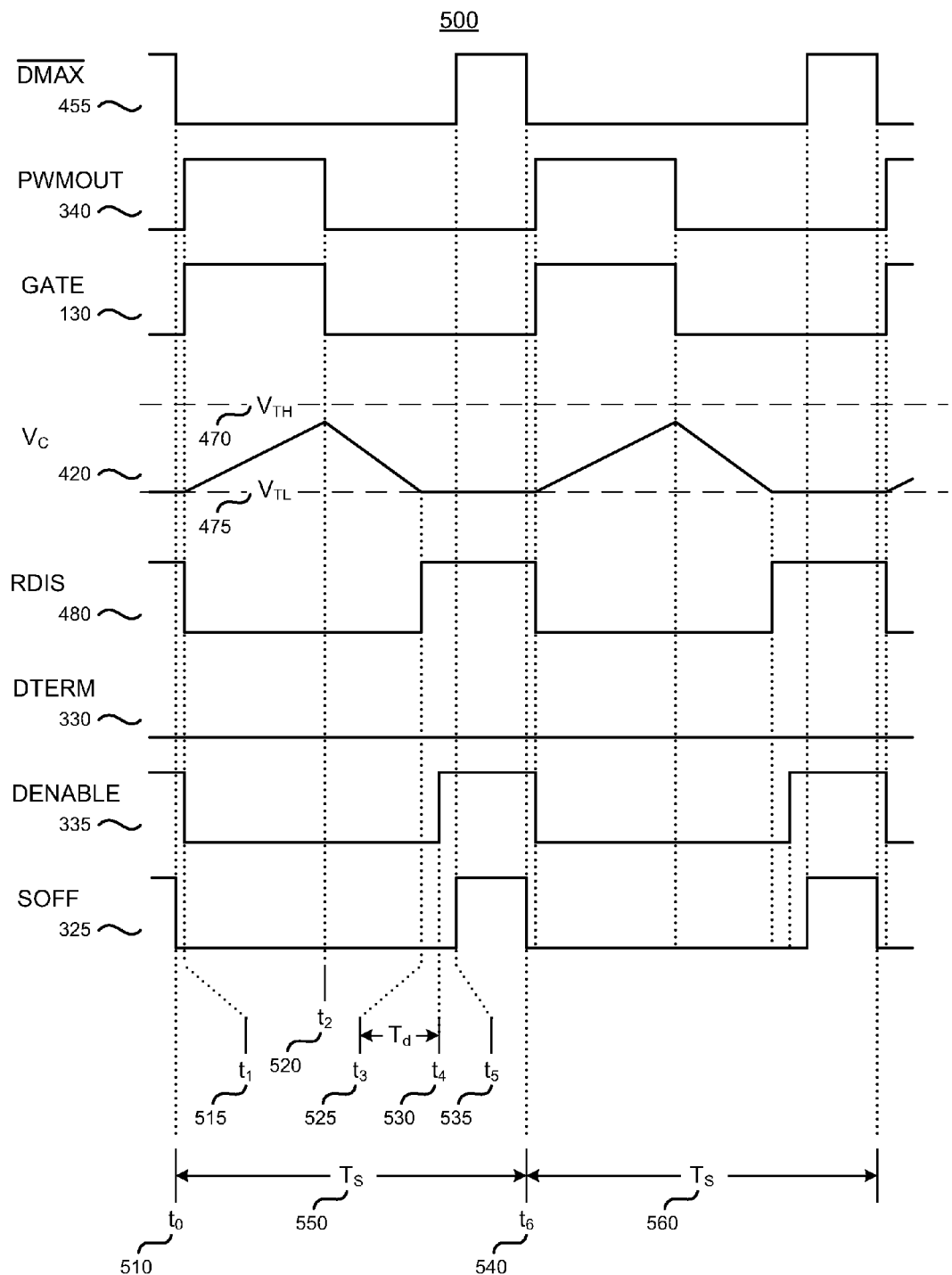
FIG. 5 is a timing diagram that shows signals of the saturation prevention circuits of FIG. 4 for a condition of normal operation that does not activate the features that prevent saturation of the transformer.

FIG. 5 is a timing diagram 500 that further illustrates the relationships among the signals in FIG. 3 and FIG. 4 for a condition that does not require any action to prevent saturation of the transformer T1 112. The DMAX complement signal 455 goes low at a time $t_0$ 510 that is the beginning of a switching period $T_S$ 550. The PWMOUT signal 340 and the GATE signal 130 go high at time $t_1$ 515, soon after time $t_0$ 510. The input voltage $V_{IN}$ 102 is applied to the primary winding 112 of the transformer T1 114 when the GATE signal 130 is high. The voltage $V_C$ 420 on the integrating capacitor 460 rises from the lower threshold voltage $V_{TL}$ 475 toward the higher threshold voltage $V_{TH}$ 470 when the GATE signal 130 is high to emulate the increase in magnetic flux of the transformer T1 114.

The PWMOUT signal 340 and the GATE signal 130 go low at time $t_2$ 520. The voltage $V_C$ 420 on the integrating capacitor 460 decreases toward the lower threshold voltage $V_{TL}$ 475 when the GATE signal 130 is low to emulate the decrease in magnetic flux of the transformer T1 114, reaching the lower threshold voltage $V_{TL}$ 475 at time $t_3$ 525. The RDIS signal 480 goes high at time $t_3$ 525 to indicate that the magnetic flux in the transformer T1 114 has returned approximately to the value it had at time $t_1$ 515. The DENABLE signal 335 goes high after a delay $T_d$ at time $t_4$ 530.

The SOFF signal 325 goes high when the DMAX complement signal 455 goes high at time $t_5$ 535. The DMAX complement signal 455 goes low at time $t_6$ 540 to end the switching period 550 and to start the next switching period 560. When the DMAX complement signal 455 goes low at time $t_6$ 540, the DENABLE signal 335 resets latch 450 to allow the GATE signal 130 to go high in response to the PWMOUT signal 340. The DTERM signal 330 stays low in the example of FIG. 5 because the voltage $V_C$ 420 on the integrating capacitor 460 remains less than the higher threshold voltage $V_{TH}$ 470.

Figure 6:
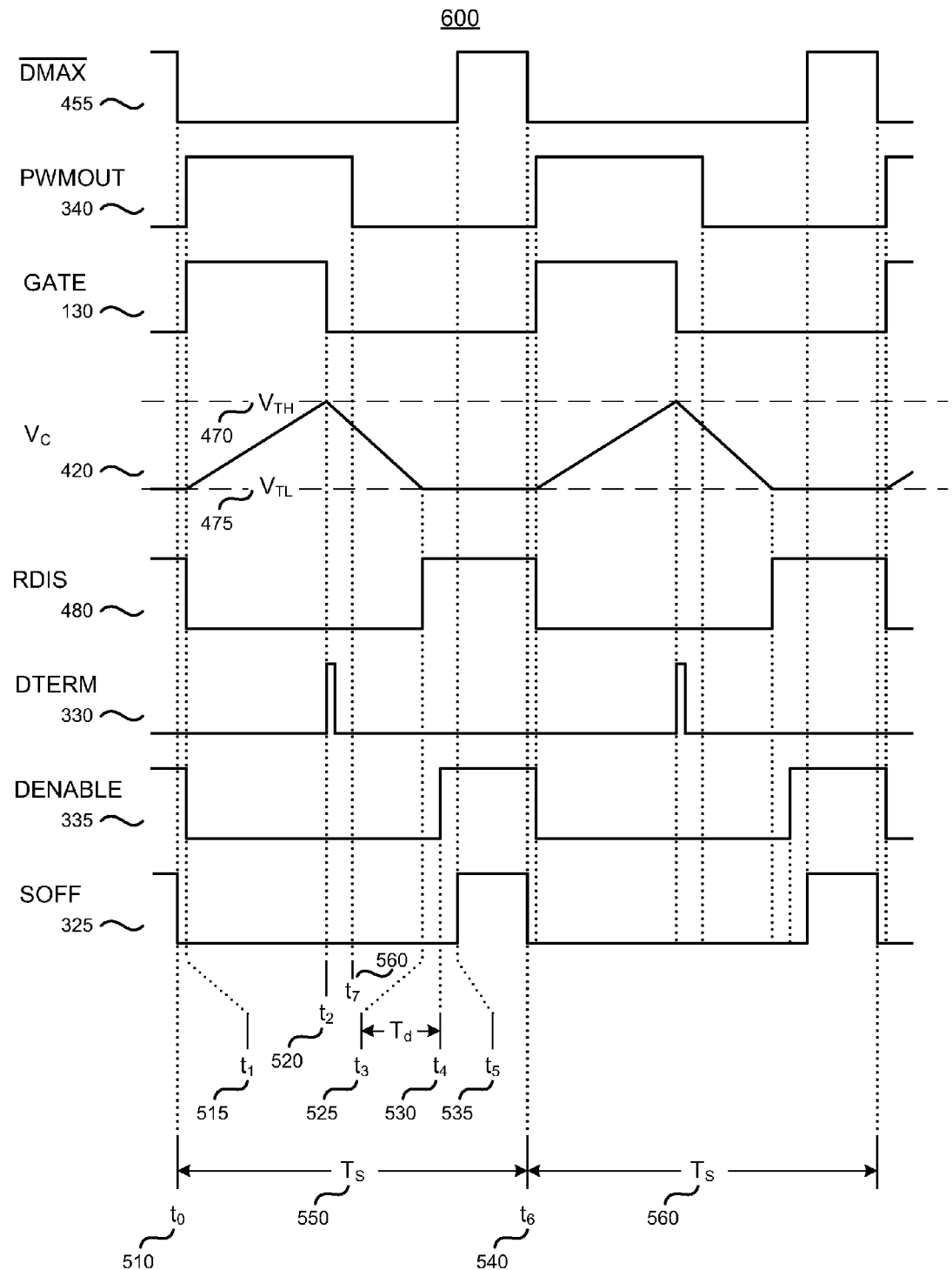
FIG. 6 is a timing diagram that shows the same signals as FIG. 5 for a condition that terminates a gate signal to prevent saturation of the transformer.

FIG. 6 is a timing diagram 600 that further illustrates the relationships among the signals in FIG. 3 and FIG. 4 for a condition that requires the circuit to open switches S1 104 and S2 116 to prevent saturation of the transformer T1 112. In the example illustrated in FIG. 6, the pulse width modulator 305 has responded to the feedback signal 132 to produce a PWMOUT signal 340 that is high from time $t_1$ 515 until time $t_7$ 560. However, at time $t_2$ 520 the voltage $V_C$ 420 on the integrating capacitor has reached the higher threshold voltage $V_{TH}$ 470, indicating that the magnetic flux in the transformer T1 114 is at its highest desired value. Thus, at time $t_2$ 520 in FIG. 6 the DTERM signal 330 goes high, forcing the GATE signal 130 low to open the switches S1 104 and S2 116, and prevent saturation of the transformer T1 114.

Figure 7:
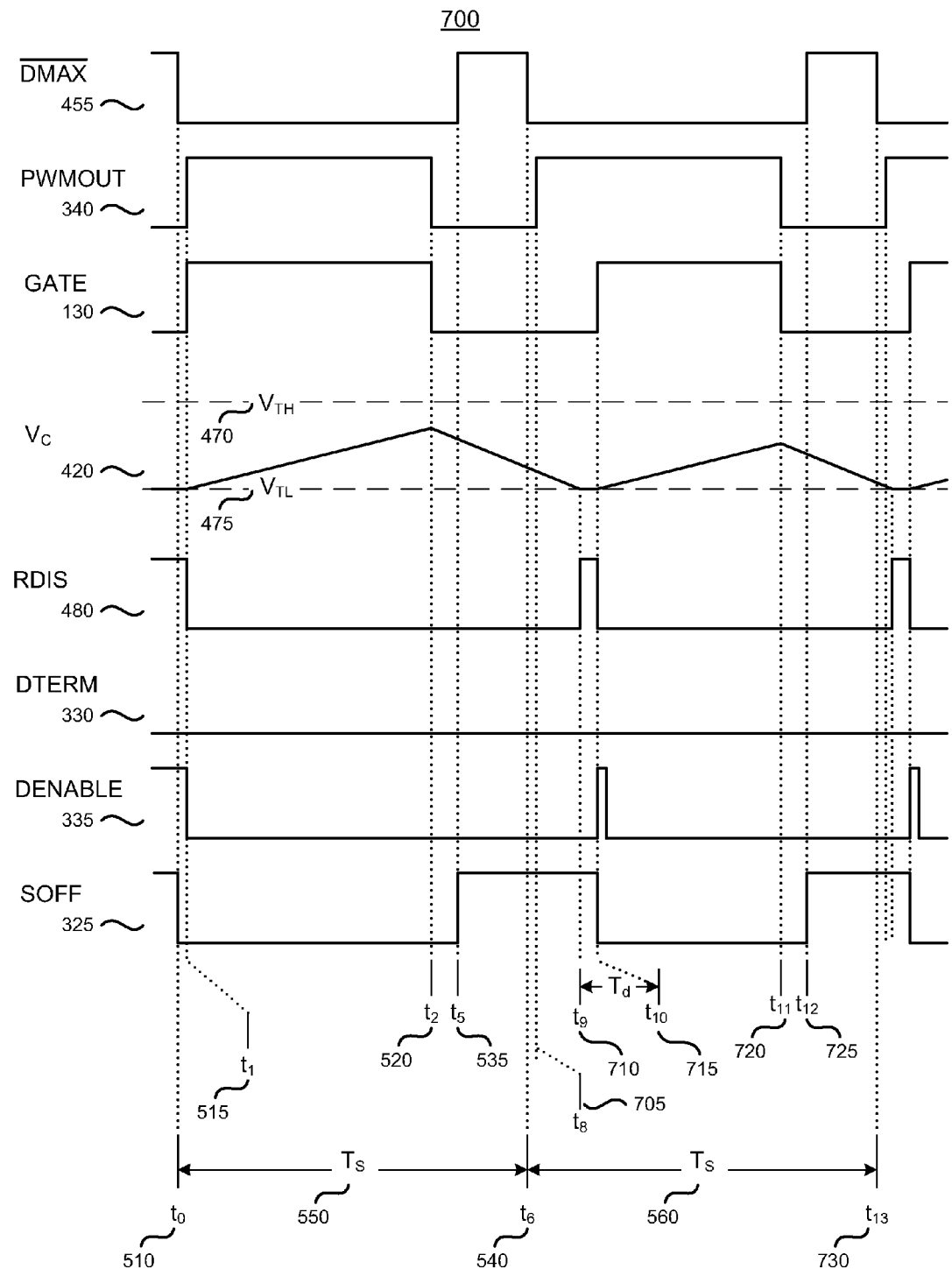
FIG. 7 is a timing diagram that shows the same signals as FIG. 5 for a condition that delays a gate signal to prevent saturation the transformer.

FIG. 7 is another timing diagram 700 that further illustrates the relationships among the signals in FIG. 3 and FIG. 4 for a condition that directs the circuit to delay the closing of switches S1 104 and S2 116 in the next switching period until the magnetic flux in the transformer T1 114 decreases by at least the amount that it had increased during the current switching period. The example illustrated in FIG. 7 shows the voltage $V_C$ 420 on integrating capacitor 460 is greater than the lower threshold voltage $V_{TL}$ 475 at the time $t_6$ 540 that is the end of switching period 550. Time $t_6$ 540 is also the beginning of the next switching period 560. PWMOUT signal 340 goes high at time $t_8$ 705 in switching period 560, but the SOFF signal 325 remains high to force the GATE signal 130 low, thereby preventing switches S1 104 and S2 116 from closing.

In the example illustrated in FIG. 7, the voltage $V_C$ 420 on integrating capacitor 460 decreases to the lower threshold voltage $V_{TL}$ 475 at time $t_9$ 710, indicating that the magnetic flux in the transformer has decreased by approximately the same amount that it had increased. The RDIS signal 480 goes high at time $t_9$ 710. After a delay time $T_d$, the DENABLE signal 335 goes high to reset the latch 450, returning the SOFF signal 325 to a low level at time $t_{10}$ 715. When the SOFF signal 325 goes low at time $t_{10}$ 715, the GATE signal 130 is allowed to go high in response to PWMOUT signal 340.

Since the voltage $V_C$ 420 on the integrating capacitor 460 is only an indication of the magnetic flux and is not a direct measurement of the magnetic flux, the delay time $T_d$ helps compensate for errors in the estimation that might produce a net increase in the magnetic flux. The delay time $T_d$ provides extra time after the voltage $V_C$ on the integrating capacitor 460 reaches the lower threshold $V_{TL}$ 475 to assure that the magnetic flux has decreased sufficiently to prevent saturation of the transformer T1 114 in subsequent switching periods.

In the next switching period 560, the GATE signal 130 and the PWMOUT signal 340 go low at time $t_{11}$ 720. The SOFF signal 325 goes high again at time $t_{12}$ 725 when the latch 450 is set by the DMAX complement signal 455. The end of the next switching period 560 occurs when DMAX complement signal 455 goes low at time $t_{13}$ 730.

Figure 8:
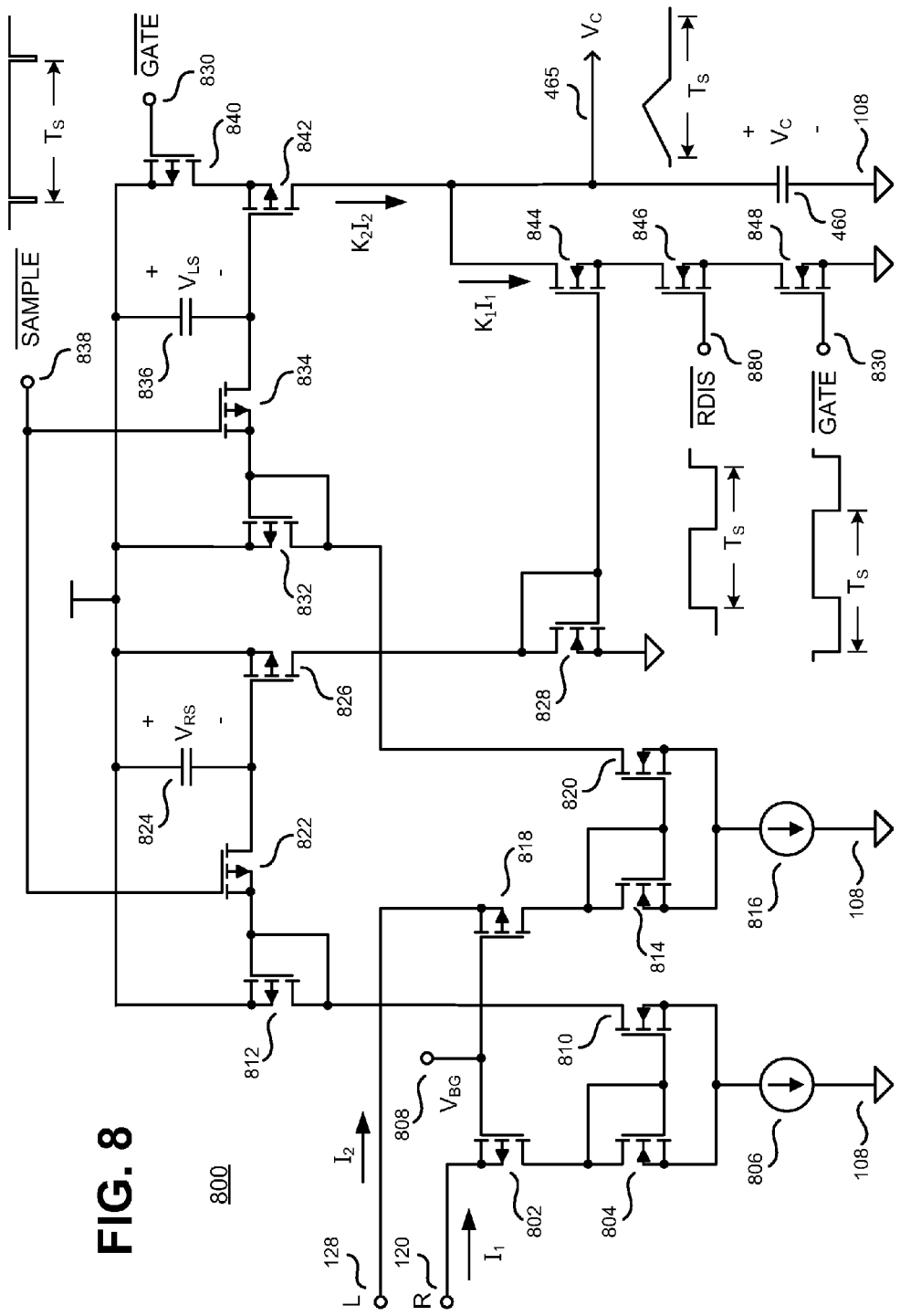
FIG. 8 is a schematic diagram that shows a portion of an integrated circuit that produces signals included the saturation prevention circuits of FIG. 4.
Figure 9:
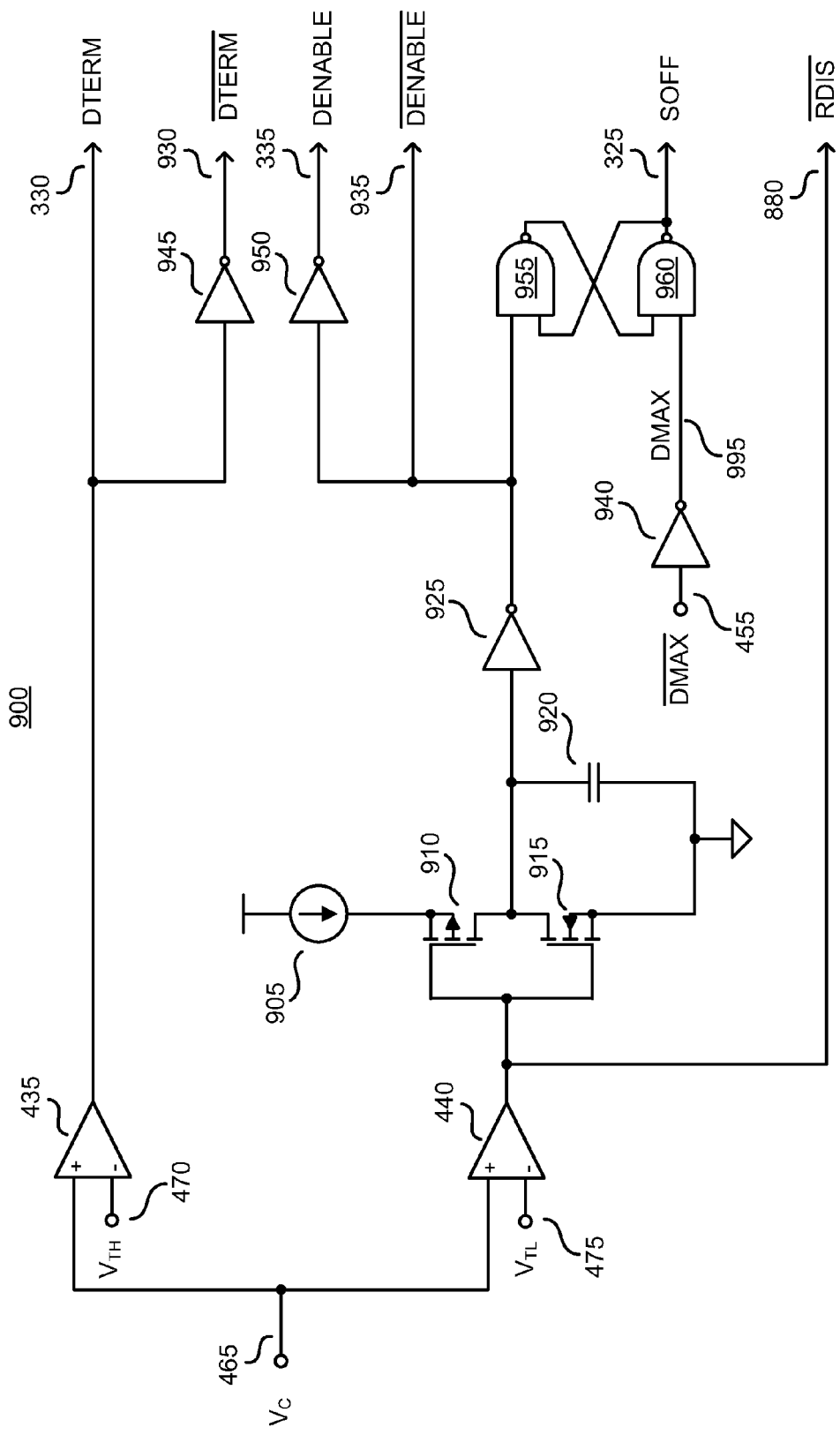
FIG. 9 is a schematic diagram that shows another portion of an integrated circuit that produces signals included in the saturation prevention circuits block and the logic circuits block of FIG. 3.
Figure 10:
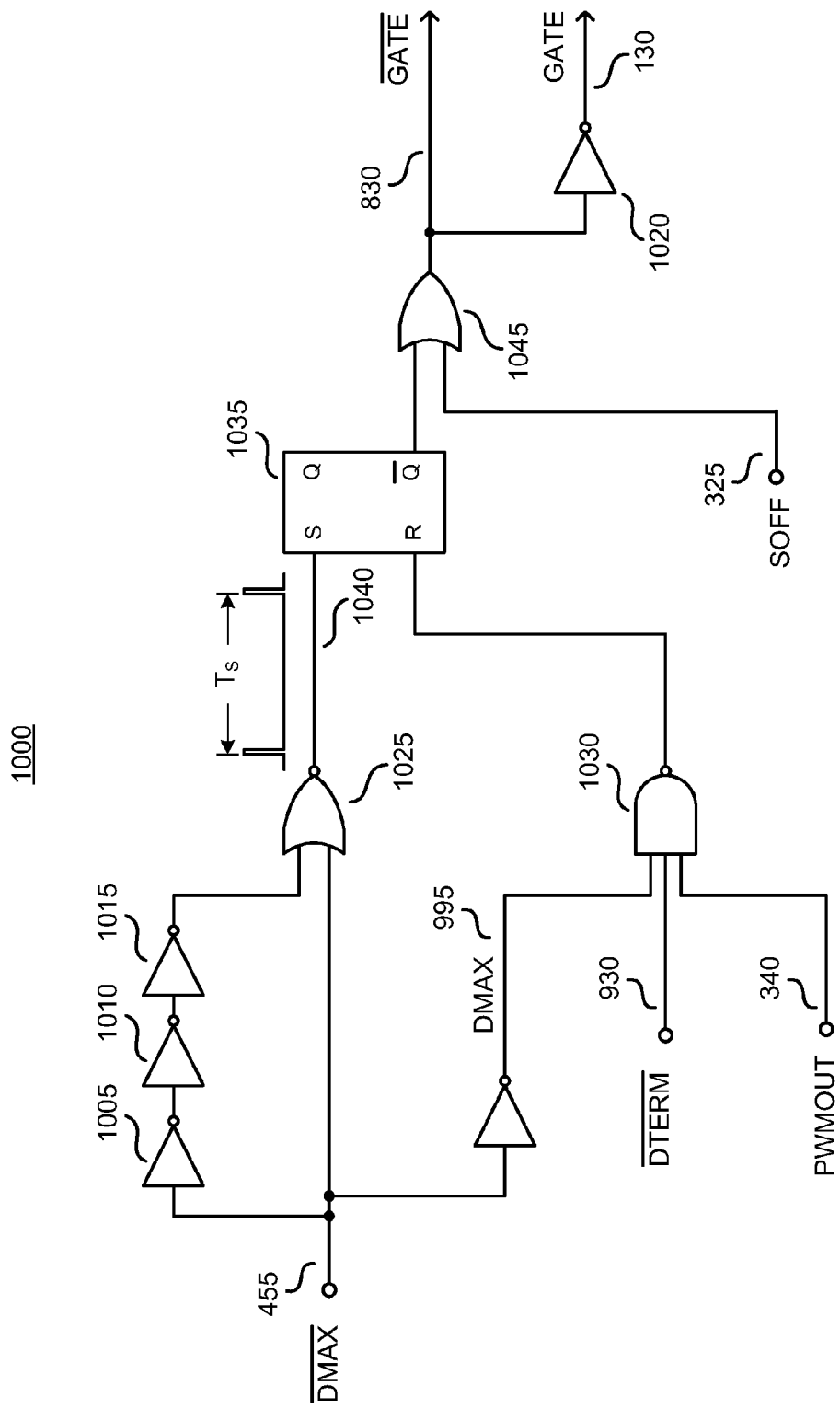
FIG. 10 is a schematic diagram that shows yet another portion of an integrated circuit that produces signals included in the logic circuits block of FIG. 3.

FIG. 8, FIG. 9, and FIG. 10 are respective schematic diagrams 800, 900, and 1000 that show an example of an integrated circuit implementation of the saturation prevention circuits and logic circuits illustrated in FIG. 3 and FIG. 4. The circuits in FIG. 8 produce the voltage $V_C$ 465 on the integrating capacitor 460 from the currents $I_1$ and $I_2$ received respectively at the reset voltage sensing terminal 128 and at the line voltage sensing terminal 120. The example of FIG. 8 uses optional sample and hold circuits to integrate sampled values of the currents rather than to integrate the currents continuously.

A benefit of using sampled values of the currents instead of the continuous values of the currents for the integration is to help avoid the undesirable influence of noise. Thus, the currents received at terminals 120 and 128 are kept as low as possible to help avoid degrading the efficiency of the power supply since those currents come from high voltages. However, keeping the currents low often results in more susceptibility to corruption from noise. In some applications, the switching of high voltages and high currents in the power supply could introduce noise currents of sufficient magnitude into the terminals 120 and 128 to cause a significant error in the value of the voltage $V_C$ 465 on the integrating capacitor 460. Accordingly, the circuit shown in FIG. 8 samples the currents near the end of each switching period at a time when there is no switching to generate noise. The sampling circuit holds the values of the sampled current for integration throughout the following switching period.

In FIG. 8, line voltage sensing terminal 128 and reset voltage sensing terminal 120 receive respective currents $I_2$ and $I_1$. The gates of P-channel transistors 802 and 818 are held at a voltage $V_{BG}$ 808 to establish the voltage at terminals 120 and 128. The voltage at terminals 120 and 128 is limited to $V_{BG}$ plus a P-channel threshold voltage. N-channel transistors 804 and 810 form a current mirror that limits the sum of the currents in transistors 804 and 810 to the value of current source 806. Similarly, N-channel transistors 814 and 820 form a current minor that limits the sum of the currents in transistors 814 and 820 to the value of current source 816. The current in P-channel transistor 812 is proportional to the current $I_1$ received at line voltage sensing terminal 128. The current in P-channel transistor 832 is proportional to the current $I_2$ received at reset voltage sensing terminal 120.

The voltage between the drain and source terminals of P-channel transistor 812 is directly proportional to the current $I_1$. The voltage between the drain and source terminals of P-channel transistor 832 is directly proportional to the current $I_2$. A sample signal 838 at the respective gates of P-channel transistors 822 and 834 allows a reset voltage sampling capacitor 824 and a line voltage sampling capacitor 836 to charge to the voltages developed across the P-channel transistors 812 and 832 respectively.

The GATE complement signal 830 at the gate of P-channel transistor 840 applies the line sense voltage $V_{LS}$ of line voltage sense capacitor 836 between the source and gate of P-channel transistor 842 to produce a current $K_2 I_2$ that charges integrating capacitor 460 while the switches S1 104 and S2 116 are closed. Thus, the integrating capacitor 460 charges with a current that is directly proportional to the input voltage $V_{IN}$ 102. Similarly, the reset sense voltage $V_{RS}$ of reset voltage sense capacitor 824 is applied between the source and gate of P-channel transistor 826 to produce a current in P-channel transistor 826 and N-channel transistor 828 that is mirrored by N-channel transistor 844 to produce a current $K_1 I_1$ that discharges integrating capacitor 460 when N-channel transistors 846 and 848 are both on. Thus, the integrating capacitor 460 discharges with a current that is directly proportional to the reset voltage of the transformer T1 114.

The RDIS complement signal 880 at the gate of N-channel transistor 846 prevents the discharge of the integrating capacitor 460 when the voltage $V_C$ 465 on integrating capacitor 460 is below a lower threshold voltage $V_{TL}$ 475. The GATE complement signal 830 at the gate of N-channel transistor 848 prevents the discharge of the integrating capacitor 460 when the switches S1 104 and S2 116 are closed.

FIG. 9 shows that the RDIS complement signal 880 is the output of comparator 440 that determines whether or not the voltage $V_C$ 465 on the integrating capacitor 460 is greater than the lower threshold voltage $V_{TL}$ 475. Current source 905, P-channel transistor 910, N-channel transistor 915, timing capacitor 920, and inverter 925, and inverter 950 perform the function of the leading edge delay circuit 445.

NAND gates 955 and 960 perform the function of the latch 450. Inverter 940 receives the DMAX complement signal 455 to produce the DMAX signal 995 at one input of NAND gate 960. The latch is set when the DMAX signal 995 goes low. The output of an inverter 925 is the DENABLE complement signal 935. The latch formed by NAND gates 955 and 960 is reset when the DENABLE complement signal 935 goes low.

Inverter 945 produces a DTERM complement signal 930 from the output of comparator 435. Inverter 950 produces a DENABLE signal 335 from the DENABLE complement signal 935.

FIG. 10 illustrates a circuit 1000 that shows how GATE signal 130 and GATE complement signal 830 are derived from the DMAX complement signal 455. The NOR gate 1025 receives the DMAX complement signal 455 at one input. The other input of the NOR gate 1025 receives the DMAX complement signal 455 after it is delayed by inverters 1005, 1010, and 1015. The output 1040 of NOR gate 1025 is a train of pulses that sets a latch 1035 at the start of each switching period. The latch 1035 is reset when the output of NAND gate 1030 goes high. OR gate 1045 is used to gate the Q complement output of latch 1035 with the SOFF signal 325. The output of OR gate 1045 is GATE complement signal 830. Inverter 1020 inverts the GATE complement signal 830 to produce the GATE signal 130.

Figure 11:
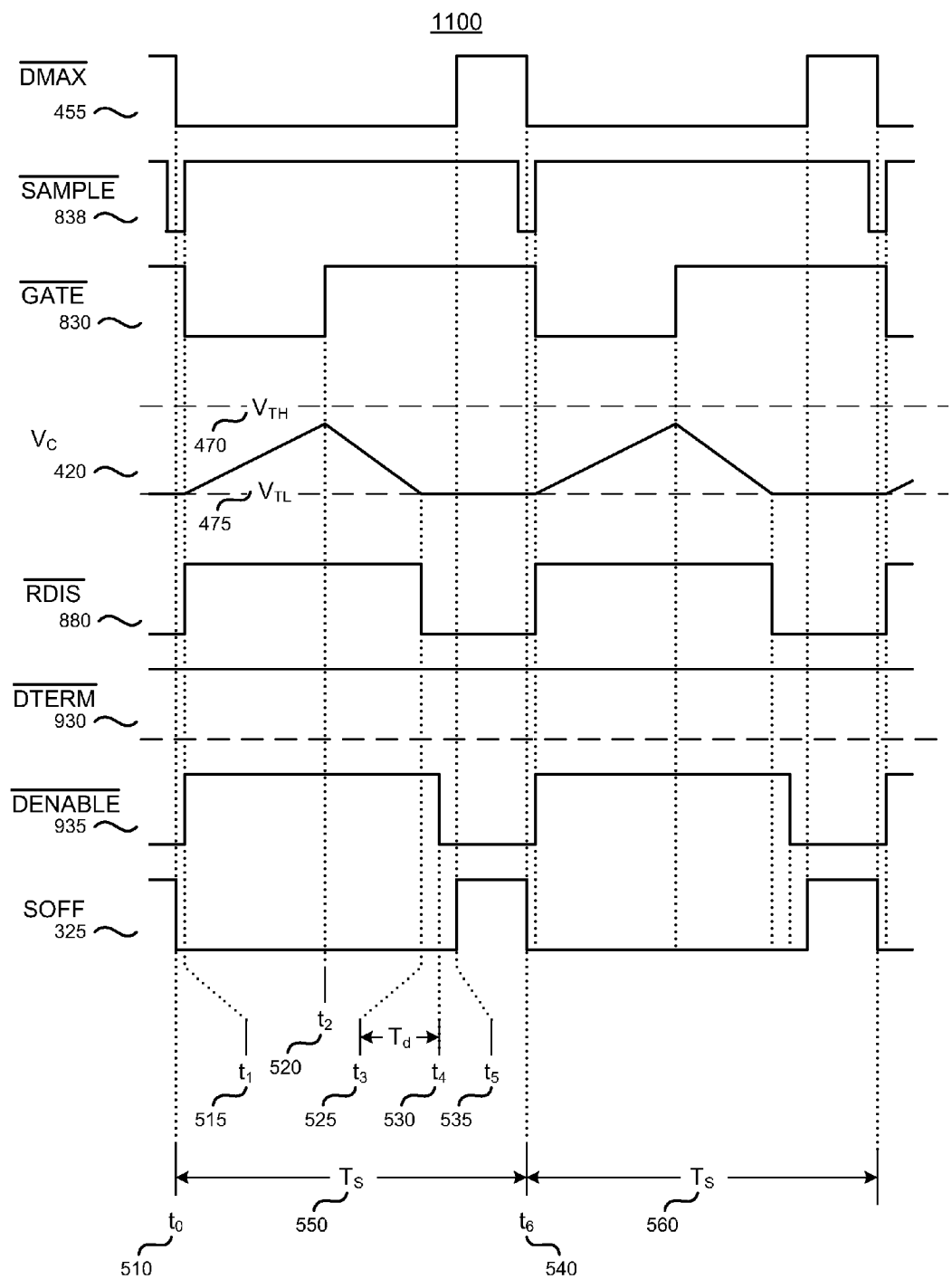
FIG. 11 is a timing diagram that shows signals from the portions of the integrated circuit illustrated in FIG. 8, FIG. 9, and FIG. 10, for the same conditions as the timing diagram of FIG. 5.

FIG. 11 is a timing diagram 1100 that shows signals in the example integrated circuit implementation of FIG. 8, FIG. 9, and FIG. 10 for similar conditions as presented in FIG. 5. FIG. 11 shows the SAMPLE complement signal 830 along with the complements of several signals shown in FIG. 5. FIG. 11 shows that the SAMPLE complement signal 830 goes low just before the beginning of the switching period at times $t_0$ 550 and $t_6$ 540.

Figure 12:
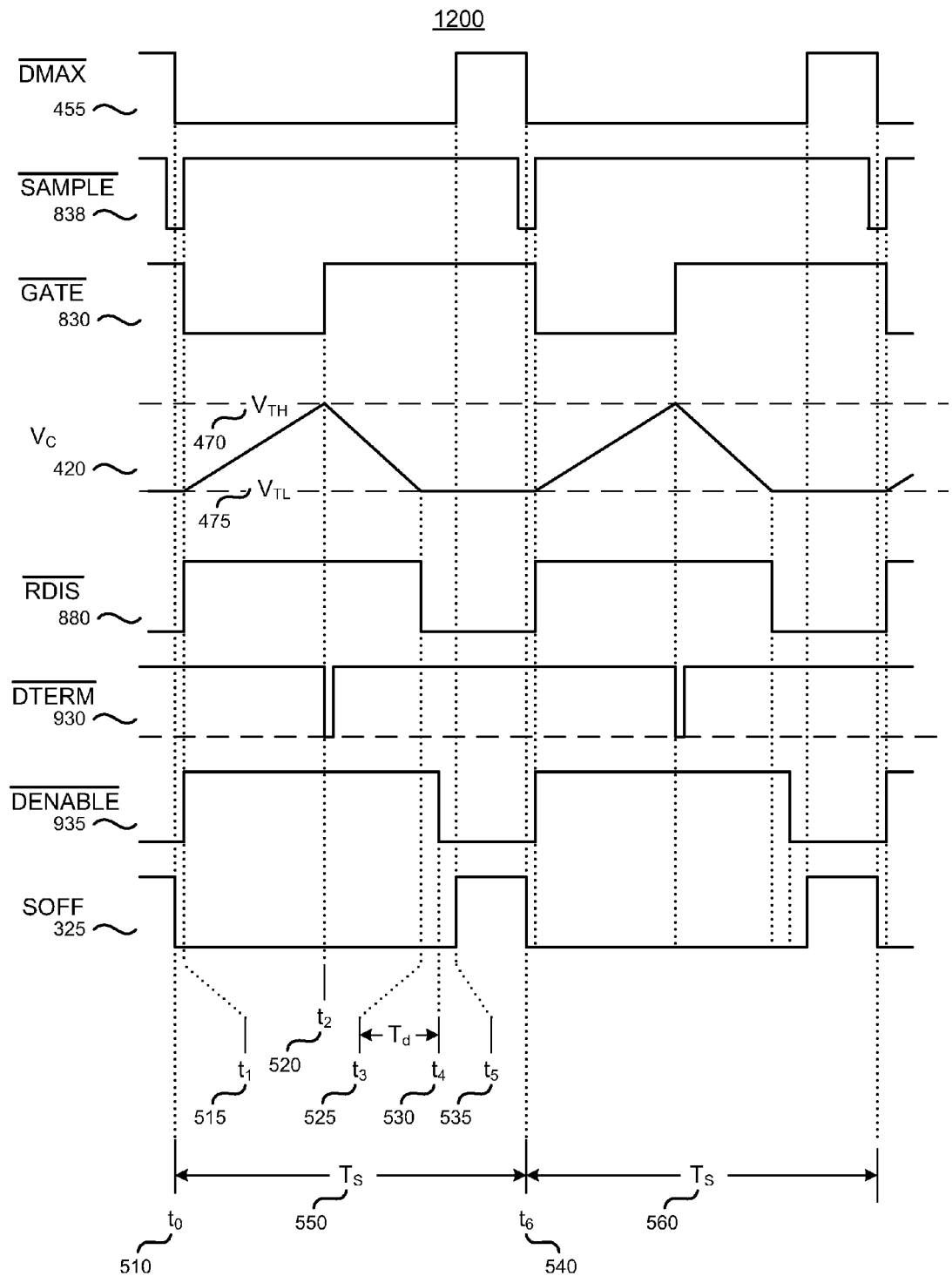
FIG. 12 is a timing diagram that shows signals from the portions of the integrated circuit illustrated in FIG. 8, FIG. 9, and FIG. 10, for the same conditions as the timing diagram of FIG. 6.

FIG. 12 is a timing diagram 1200 that shows signals in the example integrated circuit implementation of FIG. 8, FIG. 9, and FIG. 10 for similar conditions as presented in FIG. 6.

Figure 13:
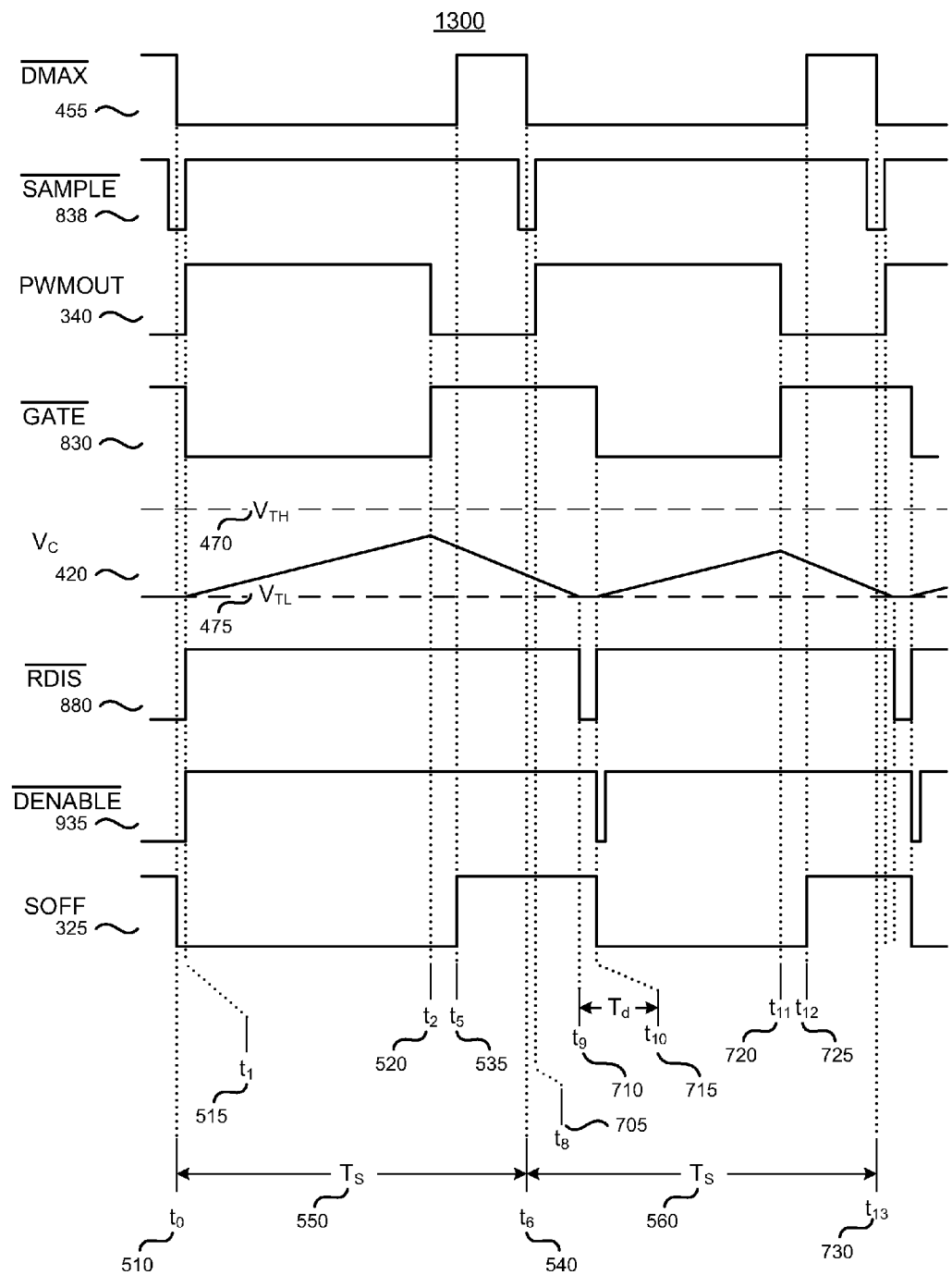
FIG. 13 is a timing diagram that shows signals from the portions of the integrated circuit illustrated in FIG. 8, FIG. 9, and FIG. 10, for the same conditions as the timing diagram of FIG. 7.

FIG. 13 is a timing diagram 1300 that shows signals in the example integrated circuit implementation of FIG. 8, FIG. 9, and FIG. 10 for similar conditions as presented in FIG. 7.

Figure 14:
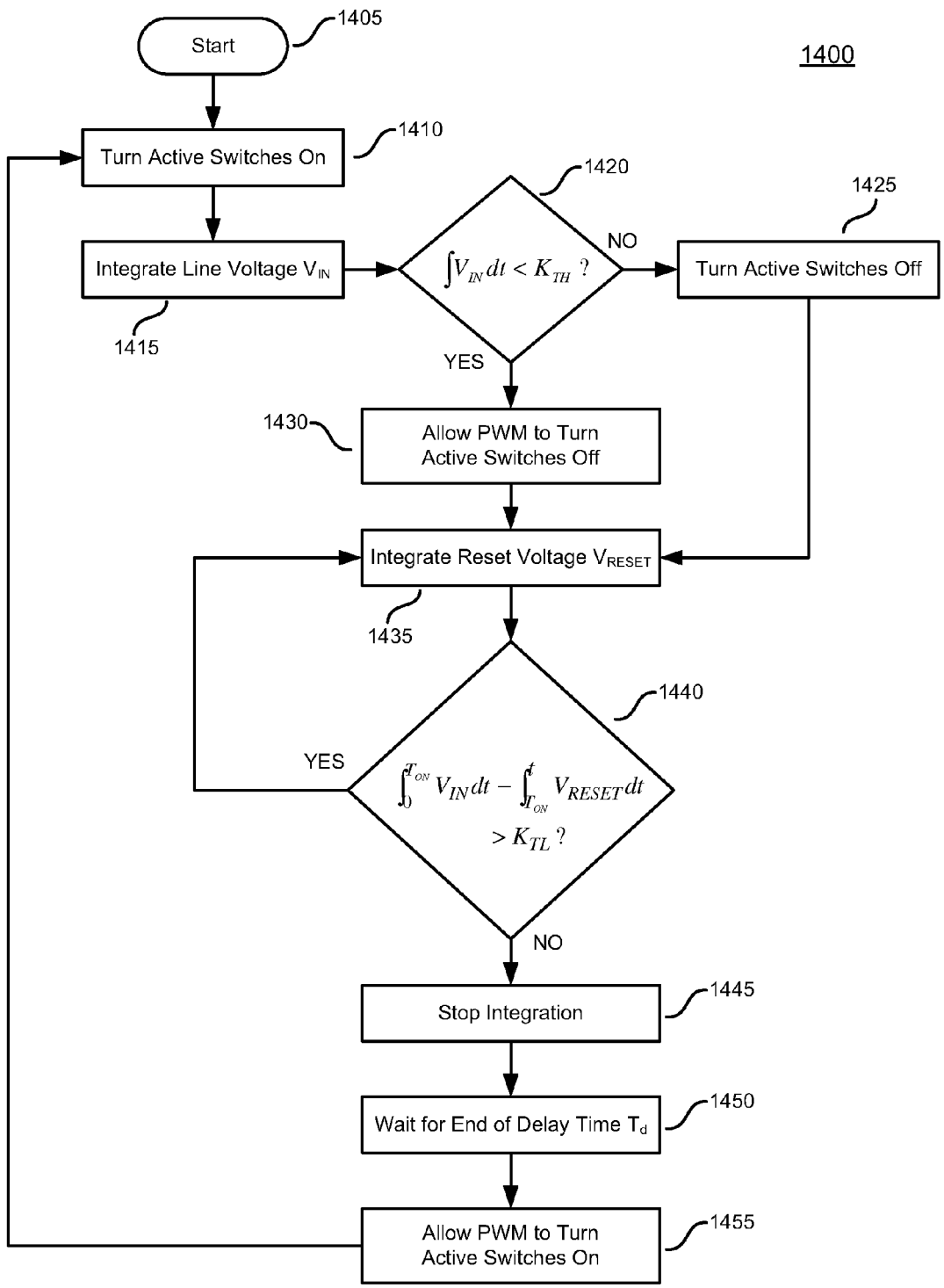
FIG. 14 is a flow diagram that illustrates a method to prevent transformer saturation in a forward converter.

FIG. 14 is a flow diagram 1400 that illustrates a method of the invention. After starting in block 1405, active switches are closed in block 1410. Integration of the line voltage begins in block 1415 after the active switches close in block 1410. Decision block 1420 compares the integrated line voltage to a threshold value $K_{TH}$. If the integral of the line voltage is less than the threshold value $K_{TH}$, then the pulse width modulator is allowed to open the active switches in block 1430. If the integral of the line voltage is not less than the threshold value $K_{TH}$, then the active switches are opened in block 1425. The reset voltage for the transformer is integrated in block 1435 after the active switches open.

Decision block 1440 compares the difference between the value of the integrated input voltage and the value of the integrated reset voltage to a lower threshold value $K_{TL}$ during the integration of the reset voltage. The integration of the reset voltage continues as long as the difference between the integrated input voltage and the integrated reset voltage is greater than the lower threshold value $K_{TL}$. The integration stops in block 1445 when the difference between the integrated input voltage and the integrated reset voltage is not greater than the lower threshold value $K_{TL}$.

After a delay time $T_d$ in block 1450, the pulse width modulator is allowed to close the active switches in block 1455. The flow continues in block 1410.

Figure 15:
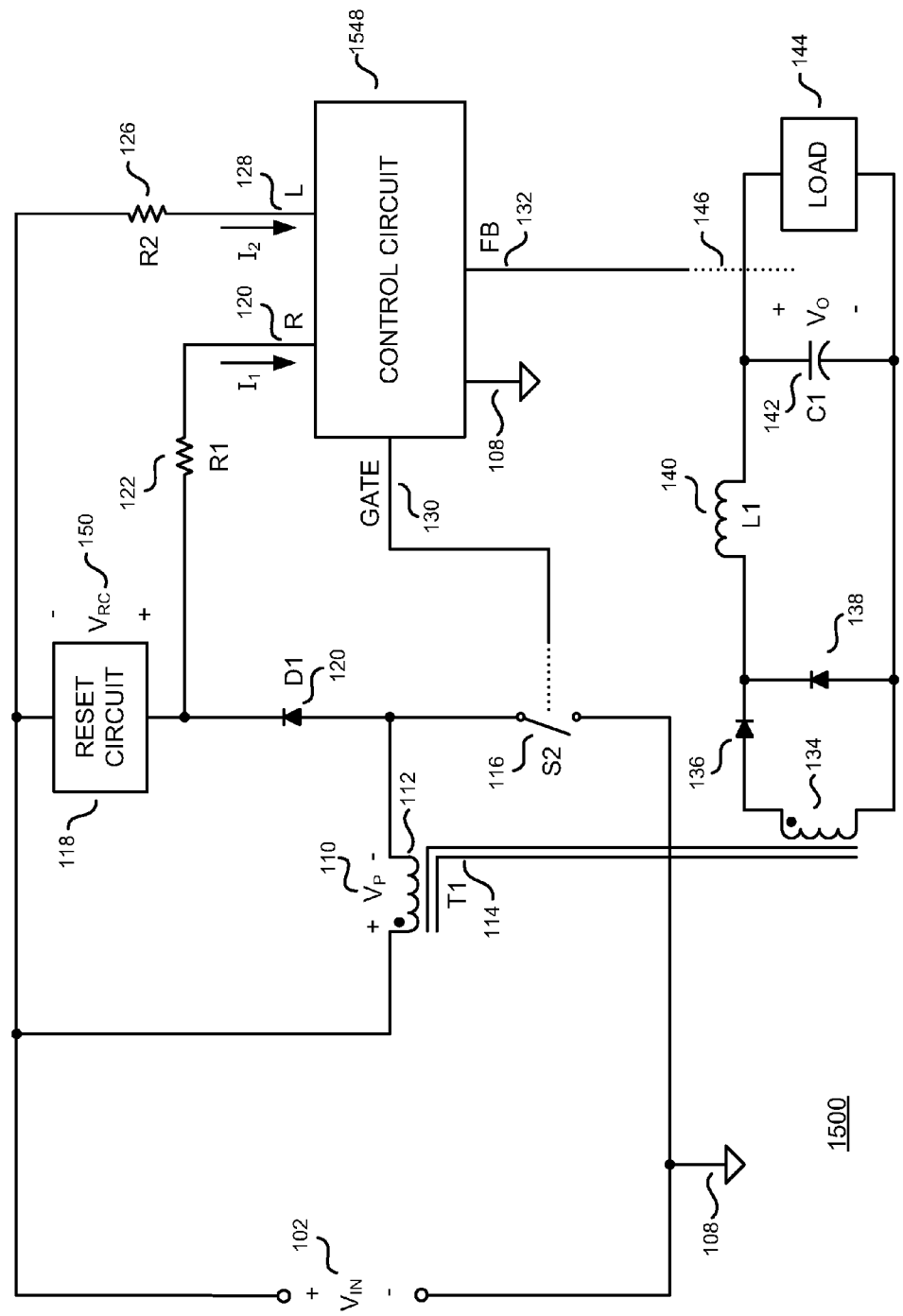
FIG. 15 is a schematic diagram that illustrates the salient features of a single-switch forward converter with a control circuit that includes the invention.
Figure 16:
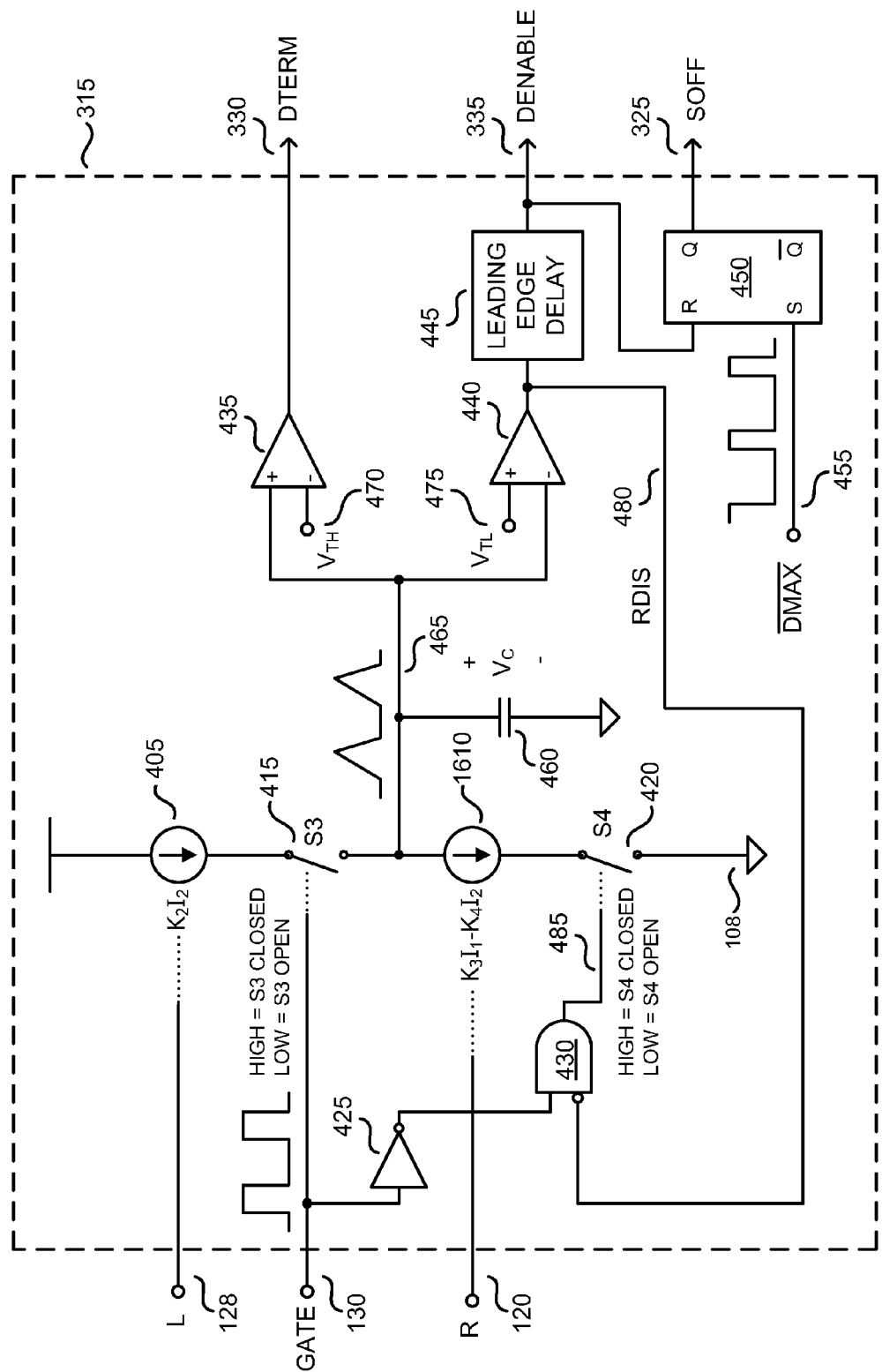
FIG. 16 is a schematic diagram that illustrates another example of the functions included in the saturation prevention block included in the control circuit of FIG. 3 for a single-switch forward converter.

The invention is not limited to the example two-switch forward converter, but can be applied easily to a single-switch forward converter as illustrated in FIG. 15 and FIG. 16. FIG. 15 is schematic diagram 1500 that shows the salient features of a single-switch forward converter that uses many of the same components as the two-switch forward converter of FIG. 1. The control circuit 1548 for the single-switch forward converter is modified from the control circuit 148 for the two-switch forward converter as illustrated in FIG. 16.

FIG. 16 is schematic diagram 1600 that shows that the controlled current source 1610 that discharges the integration capacitor 460 has a different value in the application to the single-switch forward converter than the controlled current source 410 has in the application to the two-switch forward converter. In the application to the single-switch forward converter, the value of controlled current source 1610 is the difference $(K_3I_1-K_4I_2)$ between a value directly proportional to the current in resistor R2 126 and a value directly proportional to the current in resistor R1 122, whereas the value of controlled current source 410 is directly proportional to the current in resistor R1 122 only.

The above description of illustrated examples of the present invention, including what is described in the Abstract, are not intended to be exhaustive or to be limiting as to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter, comprising:
   a transformer having a primary winding;
   a switch coupled to the transformer to selectively apply an input voltage to the primary winding;
   a reset circuit coupled to the primary winding to generate a reset circuit voltage from a magnetizing current that leaves the transformer when the switch is off; and
   a control circuit coupled to the switch, wherein the control circuit includes:
      a pulse width modulator coupled to generate a pulse width modulation signal in response to a feedback signal;
      logic circuits coupled to turn the switch on and off to regulate an output of the power converter in response to the pulse width modulation signal; and
      saturation prevention circuits coupled to the logic circuits to assert a first signal when a first integral value of the input voltage reaches a first threshold value and to assert a second signal after a delay time that begins when a difference between the first integral value and a second integral value of a reset voltage of the transformer falls to a second threshold value, wherein the logic circuits are adapted to turn off the switch when the first signal is asserted, and to allow the switch to turn on and off in accordance with the pulse width modulation signal when the second signal is asserted.

2. The power converter of claim 1, wherein the reset voltage of the transformer is the reset circuit voltage.

3. The power converter of claim 1, wherein the power converter is a two-switch power converter such that the switch includes a first switch and a second switch coupled to apply the input voltage to the transformer, and wherein the reset voltage is a sum of the input voltage and the reset circuit voltage.

4. The power converter of claim 3, wherein the reset circuit comprises a capacitor coupled between an input of the power converter and the transformer to generate the reset circuit voltage that is substantially constant for several switching cycles of the switch.

5. The power converter of claim 4, wherein the reset circuit further comprises a Zener diode and a resistor coupled to substantially limit a maximum voltage on the capacitor.

6. The power converter of claim 1, wherein the control circuit further comprises:
   a line voltage sensing terminal coupled to receive a first current that is directly proportional to the input voltage; and
   a reset voltage sensing terminal coupled to receive a second current that is directly proportional to the reset voltage.

7. The power converter of claim 6, wherein the saturation prevention circuits further comprise:
   a first controlled current source coupled to produce a charging current that is proportional to the first current;
   a second controlled current source coupled to produce a discharging current that is proportional to the second current; and
   an integrating capacitor coupled to be charged with the charging current while the switch is on and to be discharged with the discharging current when the switch is off, wherein a voltage on the integrating capacitor is representative of a magnetic flux of the transformer, and wherein the saturation prevention circuits are adapted to assert the first signal when the voltage on the integrating capacitor is greater than or equal to the first threshold value, and to assert the second signal after the delay time that begins when the integrating capacitor discharges to the second threshold value.

8. The power converter of claim 7, wherein the second controlled current source is coupled to begin discharging the integrating capacitor in response to the logic circuits opening the switch.

9. The power converter of claim 7, wherein the second controlled current source is coupled to discharge the integrating capacitor if the switch is open and if the voltage on the integrating capacitor is greater than or equal to the second threshold value.

10. The power converter of claim 7, wherein the first controlled current source is coupled to begin charging the integrating capacitor in response to the logic circuits closing the switch.

11. The power converter of claim 10, wherein the first controlled current source is coupled to end charging the integrating capacitor in response to the logic circuits opening the switch.

12. The power converter of claim 7, wherein the saturation prevention circuits further comprise:
   a first comparator coupled to compare the voltage on the integrating capacitor with the first threshold value and to output the first signal; and
   a second comparator coupled to compare the voltage on the integrating capacitor with the second threshold value; and
   a leading edge delay circuit coupled to an output of the second comparator and to generate the second signal.

13. The power converter of claim 7, wherein the saturation prevention circuits further comprise a latch coupled to generate a third signal to keep the switch turned off when the latch is set, wherein the latch is set in response to a maximum duty ratio signal being asserted and is reset in response to the voltage on the integrating capacitor discharging to the second threshold value.

* * * * *